United States Patent [19]

Fuhr et al.

[11] Patent Number: 5,792,525
[45] Date of Patent: Aug. 11, 1998

[54] CREEP RESISTANT SHAPED ARTICLE OF DENSIFIED EXPANDED POLYTETRAFLUOROETHYLENE

[75] Inventors: John-Peter Ludwig Fuhr, Wilmington; Michele Marie Gentile, Newark, both of Del.; Ross Kennedy Hutter, West Grove, Pa.; Michael Earl Kennedy, Elkton, Md.

[73] Assignee: W. L. Gore & Associates, Inc., Newark, Del.

[21] Appl. No.: 414,658

[22] Filed: Mar. 31, 1995

[51] Int. Cl.⁶ ............................................. B65D 53/00
[52] U.S. Cl. ............... 428/35.7; 428/66.2; 428/66.4; 428/66.6; 428/422; 277/227; 277/DIG. 6; 526/255; 285/910
[58] Field of Search ............... 428/64.1, 66.2, 428/66.4, 422, 66.6, 35.7; 277/227, DIG. 6; 526/255; 285/910

[56] References Cited

U.S. PATENT DOCUMENTS

| | | | |
|---|---|---|---|
| 3,728,752 | 4/1973 | Andra et al. | 14/16 |
| 3,907,310 | 9/1975 | Dufour | 277/92 |
| 4,388,259 | 6/1983 | Jewell et al. | 264/153 |
| 4,576,869 | 3/1986 | Malhotra | 422/502 |
| 4,820,787 | 4/1989 | Kataoka et al. | 526/255 |
| 4,824,898 | 4/1989 | Sukigara et al. | 524/401 |
| 5,061,561 | 10/1991 | Katayama | 428/364 |
| 5,374,473 | 12/1994 | Knox et al. | 428/218 |
| 5,492,336 | 2/1996 | Barna et al. | 277/1 |

FOREIGN PATENT DOCUMENTS

94/24467  10/1994  WIPO.

OTHER PUBLICATIONS

"Effect of first-storey shearwalls with Teflon sliders on earthquake-resistant buildings"; Y.L. Mo and Y.F. Chang; Magazine of Concrete Research, 1993, 45, No. 165, Dec., 293–300.

International Search Report for PCT/US96/00470.

*Primary Examiner*—Rena Dye
*Attorney, Agent, or Firm*—Victor M. Genco, Jr.; Carol A. Lewis White

[57] ABSTRACT

A creep resistant article is provided which is dimensioned from a stock material consisting essentially of a plurality of layers of expanded polytetrafluoroethylene which has been densified. The expanded polytetrafluoroethylene exhibits remnants of a fibril and node structure. The article is resistant to creep at high temperatures and under high loads.

14 Claims, 7 Drawing Sheets

CREEP RESISTANT SHAPED ARTICLE OF DENSIFIED EXPANDED POLYTETRAFLUOROETHYLENE

FIELD OF THE INVENTION

The present invention relates to creep resistant articles made from densified expanded polytetrafluoroethylene (ePTFE).

BACKGROUND OF THE INVENTION

Fluoropolymers are characterized as highly inert, paraffinic polymers in which some or all of the hydrogen has been replaced by fluorine. Fluoropolymers in general, and polytetrafluoroethylene (PTFE) in particular, have exhibited utility as materials for use in harsh chemical environments where many conventional polymeric materials degrade.

Although PTFE is generally accepted as an important engineering material due to its properties, the temperature up to which PTFE can be used when no compressive load is applied is about 260° C., which is far less than its sintering temperature of about 327° C. Additionally, in many applications, PTFE is used under load, and in such a case, the critical temperature up to which an article of PTFE can be used stably is far lower than 260° C. The actual temperature at which the PTFE article can be used stably will depend upon the structure, configuration and field of application of the PTFE article. This limitation of PTFE is largely due to the fact that PTFE has an inherent creeping property under load, especially at high temperatures.

For example, in the field of sealants, such as valve sealants (e.g., ball valve seats, or gate valve seats), and dynamic sealants (e.g., gland packings, U packings, or V packings), measures have been taken to overcome the problem of creeping in PTFE. One such measure is to incorporate a filler material, such as glass fiber or graphite, into the PTFE. However, sealants employing such designs are not satisfactory. These sealants are still insufficient in creep resistant properties at high temperatures, and adding fillers, such as glass fibers for example, can increase the wear of mating parts and increase the permeability of the PTFE sealing article. Also, some types of filler materials cause these sealing members to have a decreased resistance to chemicals.

With respect to gaskets as well, an area in which PTFE is also advantageously used because of its anticorrosive properties, improvement of the compressive creep resistance of the PTFE-based article is also strongly desired.

The foregoing illustrates limitations known to exist in present shaped articles of polytetrafluoroethylene. Thus, it is apparent that it would be advantageous to provide an improved shaped article directed to overcoming one or more of the limitations set forth above. Accordingly, a suitable alternative is provided including features more fully disclosed hereinafter.

SUMMARY OF THE INVENTION

The present invention advances the art of creep resistant articles beyond which is known to date as described above. In one aspect of the present invention, a creep resistant article is provided which is dimensioned from a stock material consisting essentially of one or more layers of expanded polytetrafluoroethylene which have been densified. The densified expanded PTFE material exhibits remnants of a fibril and node structure. The article is resistant to creep at high temperatures and under high loads. Compared to conventional shaped articles of PTFE and filled PTFE, the shaped articles of the present invention are exceptionally creep resistant at temperatures up to 327° C. under a load. The creep resistant articles of the present invention have an appropriate characteristic density for a full density PTFE article (i.e. about 2.1 g/cc). Although the creep resistant shaped article of the present invention may be employed in a high temperature, high load environment, this article may also be employed in any environment where creep resistance is required.

It is, therefore, a purpose of the present invention to provide an article which is resistant to creeping under load.

It is another purpose of the present invention to provide an article which is resistant to creeping under load, and which is particularly suited for use in a harsh chemical environment.

It is yet another purpose of the present invention to provide an article which is resistant to creeping under load at high temperatures.

The foregoing and other aspects will become apparent from the following detailed description of the invention when considered in conjunction with the accompanying drawing figures.

DETAILED DESCRIPTION OF THE INVENTION

Shaped articles of densified expanded PTFE (ePTFE), made in accordance with the teachings herein, are particularly useful when the following properties are required: chemical resistance, corrosion resistance, low frictional properties, non-stickiness, electrical insulating properties, heat resistance, compression creep resistance, compression resistance, impact strength, dimensional stability, gas barrier properties and tensile strength. More particularly, the shaped articles of the present invention can be advantageously utilized as sealants, gaskets, or packings, including but not limited to V-packings, U-packings, O-rings, diagonal packings, square-shaped packings, balls for check valves, valve seats, valve disks, or other sealants for valves, pumps or the like. The shaped articles of the present invention can also be used as a bearing pad, a sliding pad, or as a sliding part (e.g. a bushing, a bearing, a piston ring, or the like).

In the field of bearings, to date, conventional tetrafluoroethylene polymer articles have been used only under light loads and low sliding rate conditions, since they inevitably undergo considerable compressive creep. By contrast, the creep resistant shaped articles of the present invention can be advantageously used in the field of bearings, even when a heavy load is imposed. In this regard, the creep resistant shaped articles of the present invention may be dimensioned for use as bearing pads and sliding pads for heavy constructions, such as bridges, outdoor tanks and plant frameworks.

Creep resistant shaped articles produced in accordance with the present invention offer a distinct advantage in use in that they exhibit low compressive creep properties while being comprised of a pure form of PTFE, i.e. a form of PTFE having no fillers or other reinforcing materials. However, this is not to say that an article made in accordance with the teachings herein could not be enhanced further by the incorporation of such fillers or reinforcing materials.

The shape and dimension of the creep resistant articles of the present invention may be varied to meet the requirements of a specific application.

Creep resistant articles can be fabricated directly from an ePTFE material or may be fabricated from a stock material which may be formed as described in detail hereinafter.

Stock, from which the creep resistant articles of the present invention are formed, is made from a process which consists of densifying one or more sheets or tapes comprised of expanded polytetrafluoroethylene (ePTFE), having a microstructure defined by fibrils (i.e. thread-like elements) and nodes (i.e. particles from which fibrils emerge). Such a densification process is described in detail in U.S. Pat. 5,374,473, which is incorporated herein by reference. The sheets or tapes of ePTFE can be made in accordance with the teachings of U.S. Pat. No. 3,953,566, incorporated herein by reference.

More particularly, such a sheet or tape of expanded polytetrafluoroethylene may be made by first polymerizing a polytetrafluoroethylene (PTFE) homopolymer. This polymerization may be accomplished in accordance with the teachings of U.S. Pat. No. 4,576,869, which is incorporated herein by reference. The homopolymer was characterized by a standard specific gravity of 2.158 g/cc and a corresponding molecular weight of 23,000,000. A 60 lb. aliquot of this powder was combined with 11.04 lb. of a substantially aliphatic hydrocarbon lubricant characteristic of a boiling range of 170° C. to 210° C. After blending, the lubricated powder was compressed into a cylindrical pellet and baked at 49° C. for 18 hours. The pellet was then extruded through a rectangular die at a reduction ratio of 70:1. The tape was then dried on heated rolls in order to remove the lubricant. A portion of tape, while restrained, was then heated with air until the material reached a temperature of 250° C. The material was then simultaneously stretched in the x and y directions. The stretch ratio for the x direction was 6.00:1 while the stretch ratio for the y direction was 5.00:1. While still restrained in both the x and y directions, the material was subjected to hot air at a temperature above the crystalline melt point of PTFE in order to sinter or lock the PTFE structure.

The resulting sheet or tape had a thickness of 0.014 inches, a mass area density of 102 g/m$^2$, and was very isotropic with respect to tensile strength. The mean matrix tensile strength was 14,175 psi for the x direction and 14,523 psi for the y direction, which is essentially a balanced sheet with respect to tensile strength.

Tensile strength has been found to correlate with the amount of flow a material will exhibit when loaded perpendicularly to the stretched direction. Thus, a sheet having a balanced tensile strength can be utilized to produce a shaped article, in accordance with the teachings herein, which resists flow equally in all directions in a plane perpendicular to the load. Such an article can also be achieved by layering unbalanced sheets in two or more directions to make a final article with uniform strength in the x-y plane. For example, sheets that have been expanded in only one direction may be layered in an alternating fashion, i.e. in alternating angular orientations with respect to the direction of stretch of the sheet, to produce a sheet stock having balanced tensile strength. Alternatively, the ePTFE sheets or tapes used to form the creep resistant stock may be selected to maximize strength in a predetermined direction. More specifically, a sheet stock may be produced that is designed to have unbalanced properties to thereby provide creep resistance in a predetermined direction or directions.

The process of densifying one or more sheets or tapes of ePTFE substantially eliminates all the pores in the ePTFE while preventing the loss of thickness and/or any substantial change of shape due to flow of the material as typically occurs in a conventional platen press. In addition, the node and fibril structure of the original ePTFE sheets or tapes, as evidenced by Differential Scanning Calorimetry (DSC) peaks at 327° C. and at 380° C., is retained.

Without intending to limit the scope of the present invention, one contemplated process for the densification of the sheets or tapes of ePTFE may be accomplished by placing one or more sheets or tapes of ePTFE inside a heat and pressure stable flexible container. Thereafter, gases are evacuated from the interior of the container until the pressure in the container is 13 inches of mercury or lower. The flexible container is then subjected to a predetermined pressure and temperature, and then cooled in the container while reducing the pressure on the container.

Densification of the sheet(s) or tape(s) of ePTFE into creep resistant stock may be accomplished at times varying from about 15 minutes to in excess of four hours, at temperatures ranging from about 330° C. to about 390° C., and at pressures from about 150 psi to about 350 psi. One skilled in the art will recognize that there exists a relationship between the thickness of the stock being formed, and the times, temperatures, and pressures which are most effective for its formation. In particular, it should be understood that excessively high temperatures or long times may cause the loss of the node and fibril structure originally present in the ePTFE, and therefore, a return to poorer PTFE physical properties. Conversely, process conditions that are not aggressive enough result in only partial densification, and in some cases, formation of a stock comprising a skin of dense material over a partially densified core. In such cases, the stock is often, but not always, non-uniform in appearance.

It should be understood that an autoclave chamber can be replaced with a platen press which has been equipped with a vacuum enclosure which permits the evacuation of air and gases from the layers of ePTFE being placed under heat, pressure or both.

It should be further understood that the teachings of the present invention contemplate other methods for the manufacture of stock material from which a creep resistant shaped article may be produced. For example, such other methods include but are not limited to, processes which make use of a single or multiple layer(s) of ePTFE which are densified and are thermally locked or bonded, as well as materials which are not thermally locked or bonded. Furthermore, it is believed that processes may be utilized which enable a creep resistant article to be made of stock of one or more ePTFE layers which have not been densified, but are thermally locked, or which have not been thermally locked or bonded. It is foreseen that any or all of these methods could be used in the fabrication of a creep resistant article which is dense and thermally locked or bonded.

In summary, the creep resistant article consists essentially of a sintered, densified, expanded polytetrafluoroethylene, exhibiting remnants of a fibril and node structure as characterized by peaks at about 327° C. and about 380° C. in a thermogram of differential scanning calorimetry in the course of a temperature rise of 10° C./min., and by having a characteristic density of about 2.1 g/cc, or such an appropriate characteristic density for a full density PTFE shaped article. However, it is contemplated that the creep resistant stock may be produced to a density which is less than full density, as required by a given application.

Without intending to limit the scope of the present invention, an example is provided for producing a creep resistant stock material of densified, expanded PTFE, and for forming and dimensioning this stock material into a predetermined shaped article.

Example

Seventy plies of expanded PTFE, each with a nominal 14 mil thickness, were placed between two caul plates in an autoclave bag assembled from polyimide film (DuPont's Kapton®). The assembly was placed in an autoclave (Vacuum Press International Series 24). Vacuum was drawn in the bag, and the pressure and temperature of the autoclave were each gradually raised over a period of 55 minutes until the temperature reached 368° C. and the pressure reach 250 psi. After holding these temperature and pressure conditions for 45 minutes, the assembly was gradually cooled and the pressure was reduced over a period of about 45 minutes. The resulting sheet of material, which was originally opaque, became translucent and had a density of 2.168 g/cc.

Creep resistant shaped articles of the present invention may be formed by any suitable manufacturing method, such as but not limited to, a heated forming process and a machine forming process.

A suitable heated forming process for fabricating a creep resistant shaped article of the present invention begins with a blank of the creep resistant stock material of an appropriate shape and size. The blank can either be die cut from a sheet of stock or turned from a tube of stock of the densified ePTFE described hereinabove. In the case of an annular shaped sealing component, the blank would have approximately the same inner diameter and outer diameter as the inner diameter and outer diameter of the compression molding die set, which would be adjusted according to the thermal growth of the material, since the shape will be impressed at a temperature above ambient. For example, in the case of a ½ inch chevron V-ring with a final inner diameter and outer diameter of ½ inch and 1 inch, respectively, the blank dimensions would be about 0.520 inches and 0.995 inches, respectively. This blank will have a node and fibril orientation either in the x-y direction, if cut from a sheet stock or in a hoop direction, if cut from a tube stock. The blank is then placed in a preheated internal compression die set having a temperature ranging from about 250° C. to about 350° C. The blank must preheat for about 5 to about 15 minutes before any molding force is applied. This preheating allows slippage, and or flow, in the material structure, as opposed to severing of material membranes and/or damaging of the microscopic structure of the blank. At the conclusion of this preheating dwell time, the blank is pressed in the compression die, having a top and bottom shape, by exerting about two to about four thousand psi of stress on the blank. After holding this load on the blank for about ½ to 2 minutes, the compression die is moved to a cooling environment where the same stress will continue to be exerted on the piece. When the molding reaches a temperature of approximately 220° C., it is removed from the die set and allowed to cool further, unrestrained.

The machine forming process of fabricating a creep resistant shaped article of the present invention is similar to the heated forming process in that it begins with a creep resistant sheet stock or tube stock from which a blank is cut. This blank is cut in the same manner as described hereinabove, and then machined according to the desired shape, such as by a lathe for example.

Figure 1:
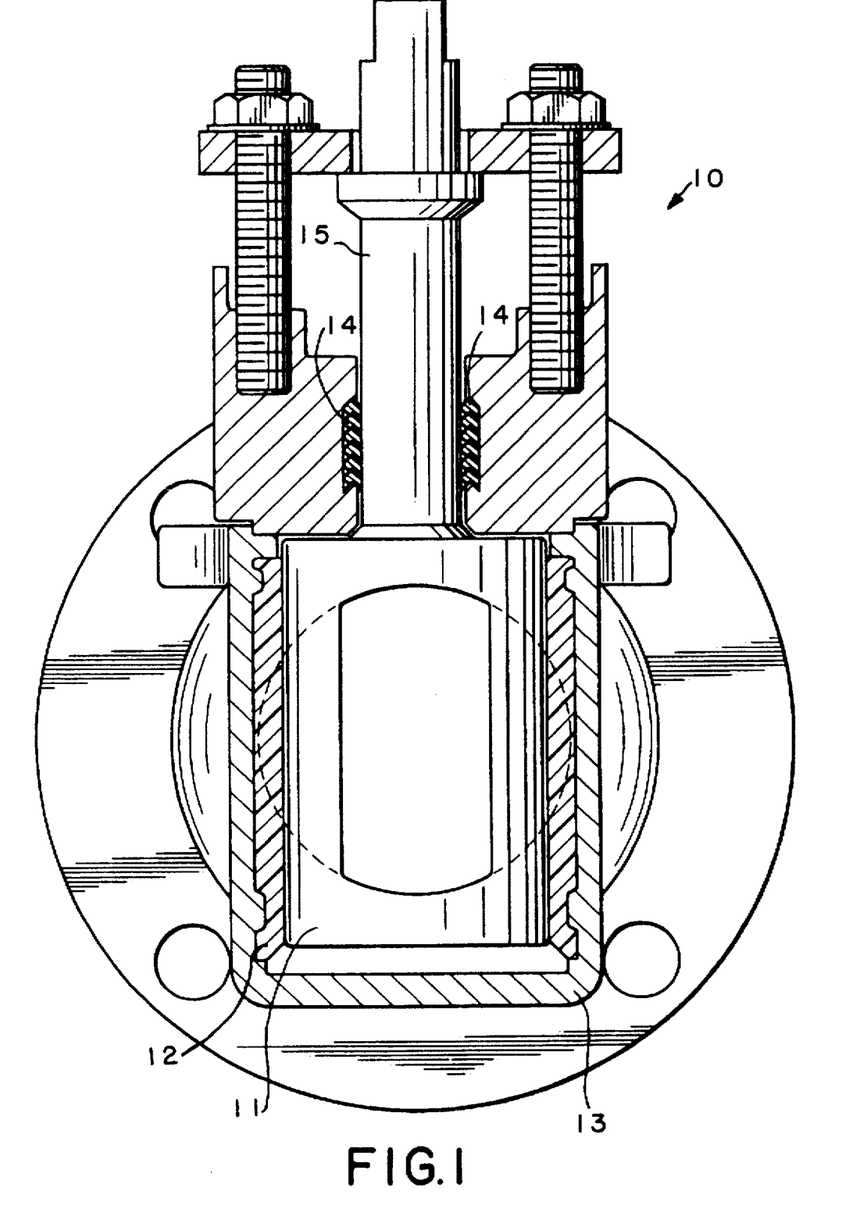
FIG. 1 is a partial, front elevation sectional view of a plug valve incorporating creep resistant valve sealants in accordance with the present invention.
Figure 2:
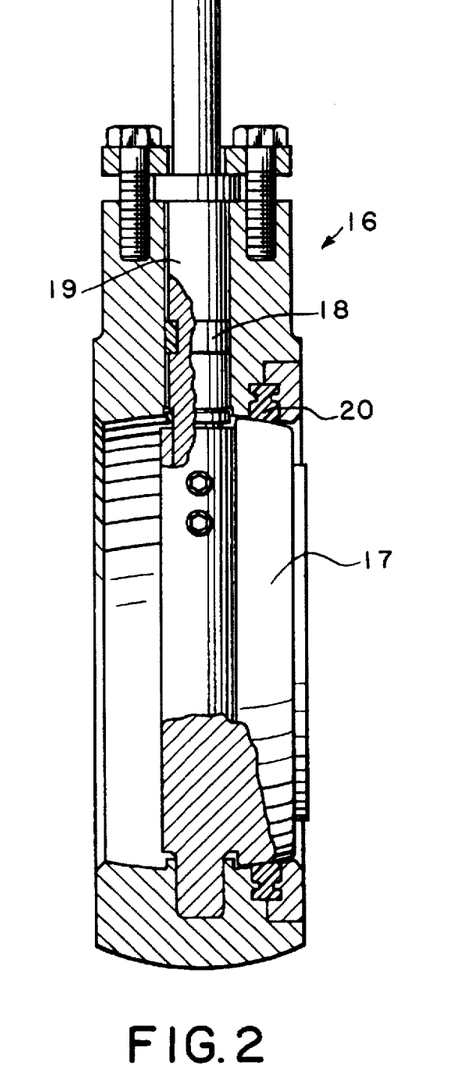
FIG. 2 is a partial, side elevation sectional view of a butterfly valve incorporating creep resistant valve sealants in accordance with the present invention.
Figures 3, 4, 5:
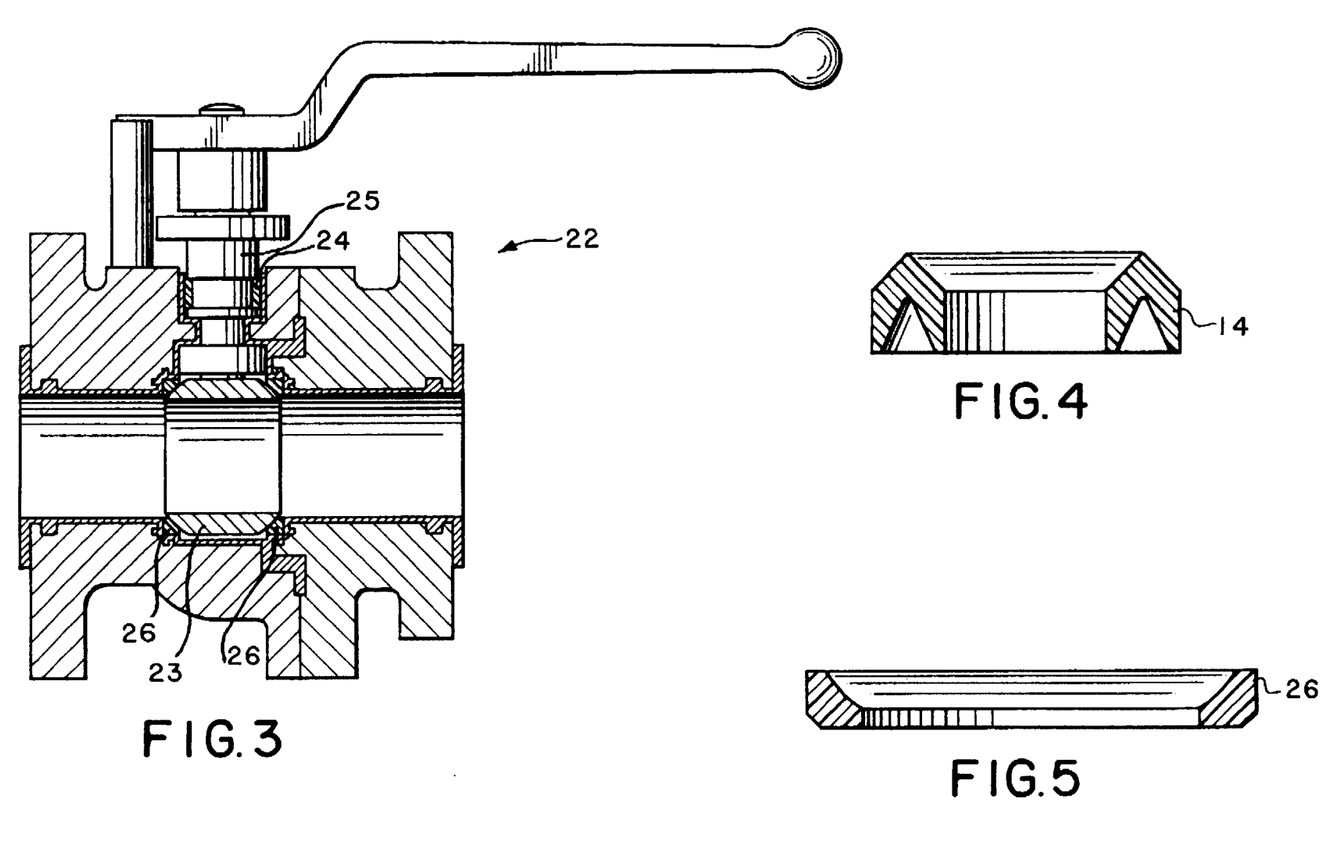
FIG. 3 is a partial, side elevation sectional view of a ball valve incorporating creep resistant valve sealants in accordance with the present invention.
FIG. 4 is a sectional view of a creep resistant article in the shape of a chevron ring for providing a seal in a valve and made in accordance with the teachings of the present invention.
FIG. 5 is a sectional view of a creep resistant article in the shape of a ball valve seat for providing a seal in a ball valve and made in accordance with the teachings of the present invention.

Referring now to the drawings, wherein similar reference characters designate corresponding parts throughout the several views, FIGS. 1, 2 and 3 illustrate valves which incorporate various creep resistant sealing elements in accordance with the present invention. FIGS. 4 and 5 detail two of such sealing elements. It should be understood that FIGS. 1–5 only represent examples of creep resistant shaped articles which may be made in accordance with the teachings herein, and are not intended to limit the scope of the present invention. As provided hereinabove, a creep resistant shaped article of the present invention may be dimensioned for use in any application requiring the article to be resistant to creeping under load, especially at high temperatures.

FIG. 1 illustrates generally at 10 a plug valve for industrial applications. Primary sealing for the plug valve is provided by the interaction of a plug 11, a full circumferential sleeve 12 and a main plug valve body 13. A plurality of chevron rings 14 provide sealing about a valve stem 15. A chevron ring 14 is illustrated in further detail in FIG. 4. The circumferential sleeve 12 and the chevron rings 14 are dimensioned from creep resistant stock in accordance with the teachings herein.

FIG. 2 illustrates generally at 16 a butterfly valve having a disk 17 which is mounted to a rotatable stem 19. Disk 17 throttles fluid flow through the valve 16. Primary valve sealing is accomplished by stem packing 18 and a seat 20, which are both dimensioned from the creep resistant stock of the present invention.

FIG. 3 illustrates generally at 22 a ball valve having a ball 23 which is mounted to a stem 25. The ball 23 throttles fluid flow through the valve 22. Primary valve sealing is accomplished by stem packing 24 and valve seats 26 which are dimensioned from the creep resistant stock of the present invention.

Figure 6:
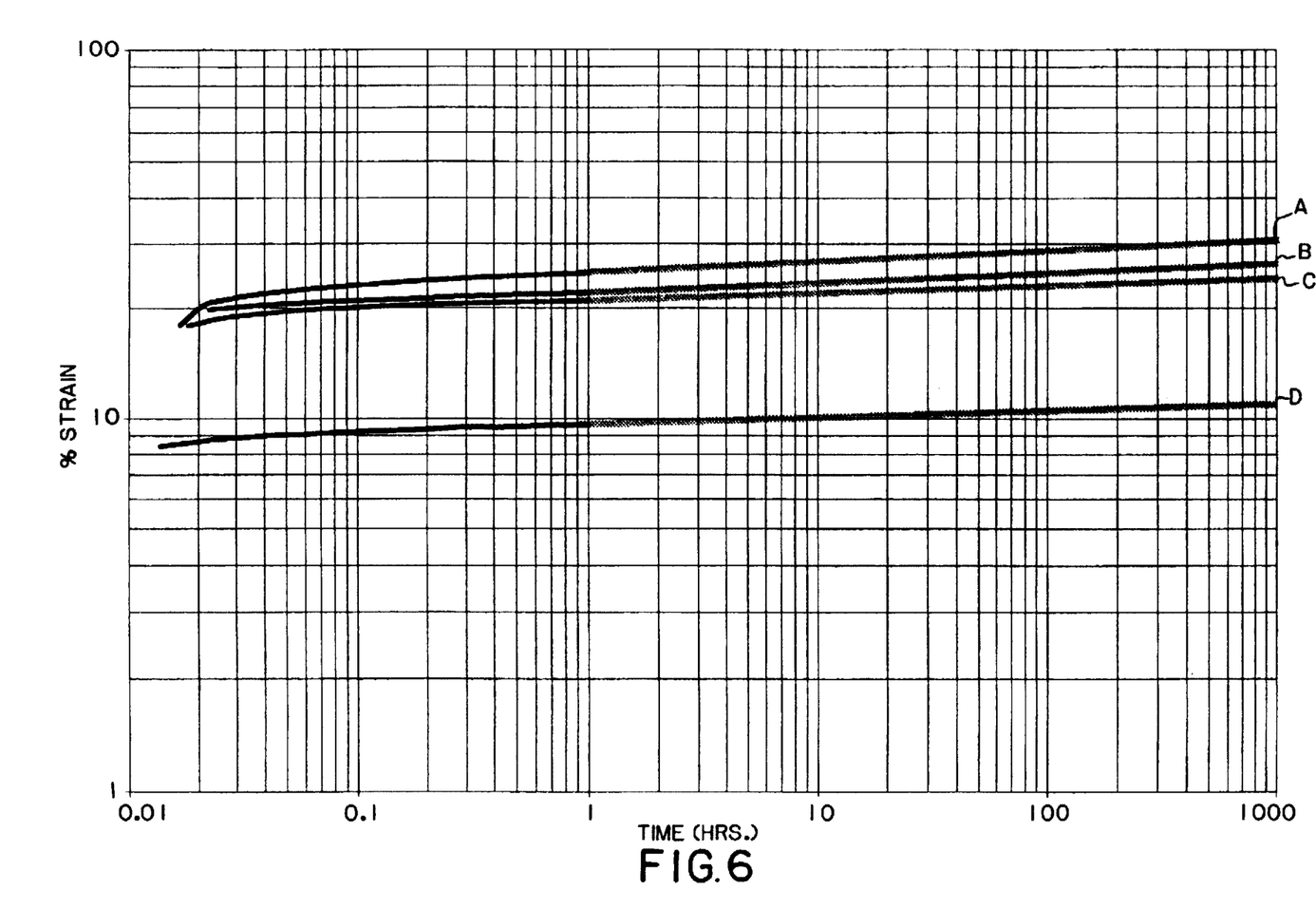
FIG. 6 is a graph of % Strain versus Time (Hr.), at a pressure of 1500 pounds per square inch (psi) and a temperature of 176° C., illustrating plots of a skived polytetrafluoroethylene (PTFE) material, a glass filled PTFE material, a graphite filled PTFE material, and the creep resistant material of the present invention.

FIG. 6 is a graph of % Strain versus Time (Hr.), at a pressure of 1500 psi and a temperature of 176° C., for four tested materials, which are illustrated as plots A, B, C and D. Plot A represents skived PTFE having 0% filler material and a density of 2.194 g/cc. Plot B represents a glass filled PTFE material having a glass filler content of 27% and a density of 2.190 g/cc. Plot C represents a graphite filled PTFE material having a graphite filler content of 19% and a density of 2.164. Plot D represents the creep resistant material of the present invention having a density of 2.168 g/cc.

Plots A-D were obtained by testing samples having a diameter of about 1.5 inches and a thickness of about 0.125 inches. The testing was accomplished using an Instron® Model 5567 testing machine. An environmental chamber that completely enclosed the samples and the testing equipment was used for heating. All tests were done under a constant load, with thickness change (measured in %) being the dependent variable.

Test conditions were 176° C. and 1500 psi initial stress on the disks. The test was run such that the load was kept at a prescribed level, so stress decreased over the duration of the test due to the area change of the sample. This is a realistic phenomenon that occurs in components that use PTFE articles such as ball valve seats. These test conditions were chosen based on information about the upper use environment for current PTFE products.

FIG. 6 illustrates the results from a one hour test, which are illustrated as log-log plots. These plots reveal essentially linear behavior of the tested materials after approximately 0.1 hours (6 minutes). As best seen by a comparison of Plots A–D, the creep resistant material of the present invention exhibited less than half the thickness reduction compared with, for example, the graphite/PTFE material represented by Plot C. The foregoing results are even more significant when these results are extrapolated to longer time periods. More particularly, using conventional superposition principles, it is possible to predict what the longer term performance of these tested materials would be under the same temperature and load conditions. Such extrapolation reveals that the alternative sheet materials of Plots A–C would have thickness changes of approximately 24% to 31% at 1000 hours, respectively, depending on filler. The creep resistant material of the present invention would have a thickness change of approximately 12%. Thus, the inventive creep resistant material begins with very low creep values, which remain very low even after long periods of time under these constant conditions.

As should be understood, the improvement in creep resistance illustrated by FIG. 6 is exhibited by sheet stock comprised of one type of ePTFE sheet, tape or membrane. By varying the processing conditions of the ePTFE sheets, the creep resistance of the sheet stock can be controlled. Reducing the amount of expansion in the membrane and reducing the matrix tensile value toward a value of 4000 psi will increase the amount of creep of the sheet stock. Therefore, creep values between the comparison materials illustrated in FIG. 6 as Plots A through C and the creep value illustrated as Plot D are possible. In addition, it is theorized that membrane expansions greater than those described herein may further reduce the creep of the sheet stock. For example, expanded polytetrafluoroethylene with a matrix tensile value of 100,000 psi or greater has been produced, which indicates that further substantial reductions in the creep value of a sheet stock may be obtained.

Figure 9:
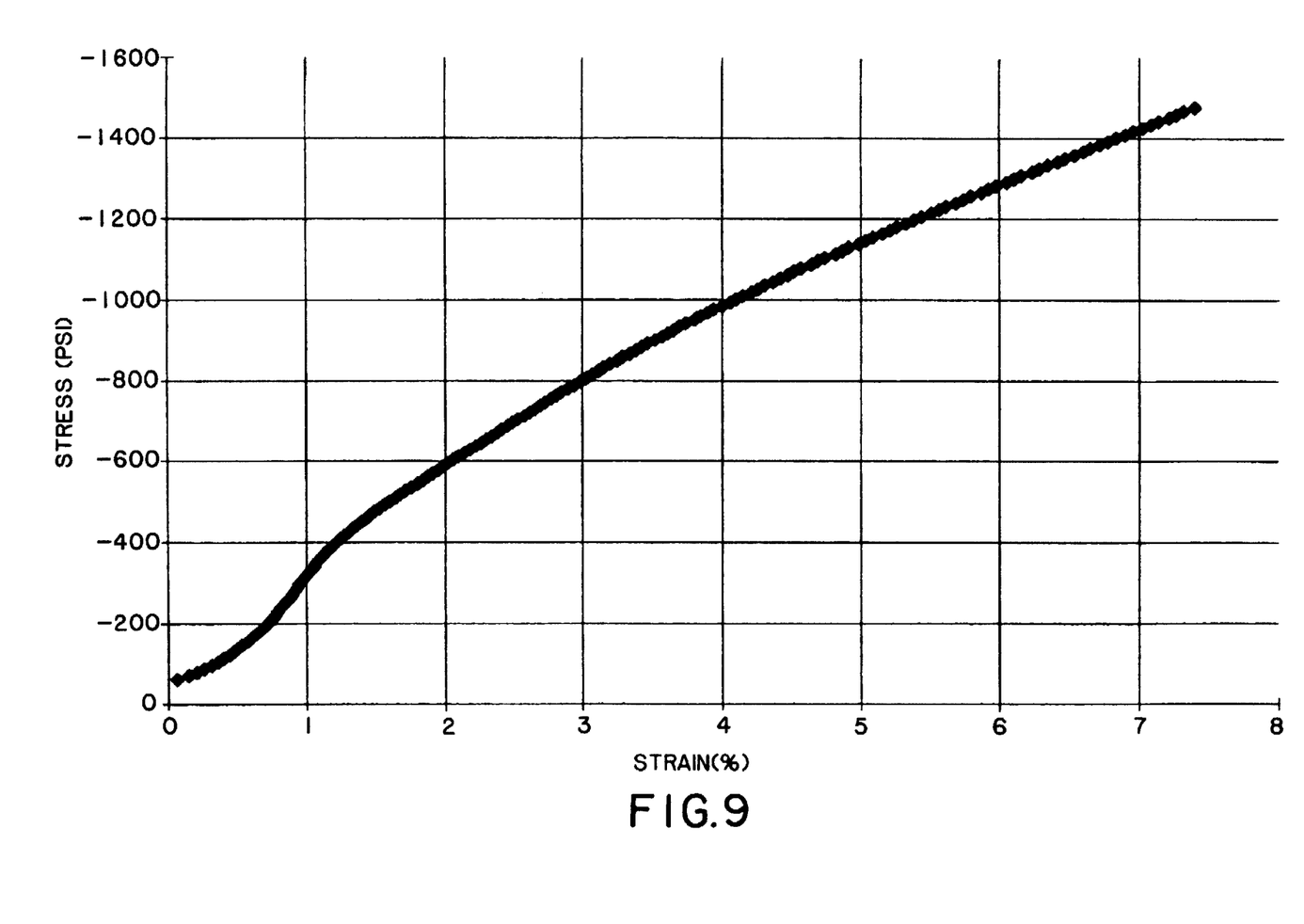
FIG. 9 is a graph of Compressive Stress versus Strain, at 176° C., illustrating a plot of the creep resistant material of the present invention.

FIG. 9 illustrates a compressive stress versus strain curve in the thickness direction for the creep resistant material of the present invention. The Young's modulus can be computed by measuring the slope of the curve. The results for the tested materials are listed below:

| Plot | % Strain @ 0.02 hours | Young's Modulus (psi) |
|---|---|---|
| A | 20 | 7500 |
| B | 19 | 7895 |
| C | 18 | 8333 |
| D | 8.5 | 17647 |

The Young's modulus of the creep resistant material of the present invention is greater than twice the Young's modulus for graphite filled ePTFE, which exhibited the greatest creep resistant properties of the known materials that were tested. This is especially significant for highly loaded, structural uses of these materials such as shaft supports.

Figure 7:
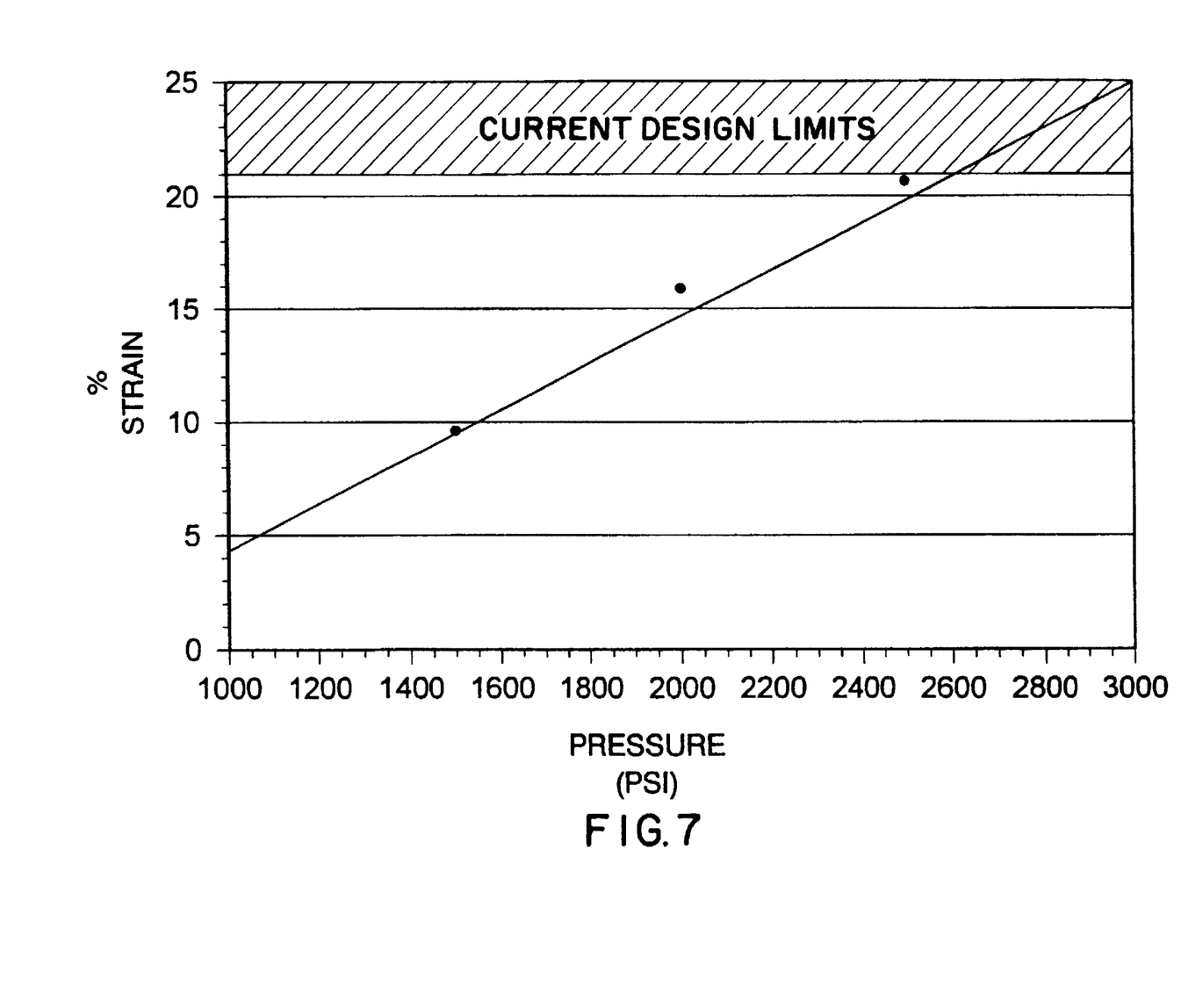
FIG. 7 is a graph of % Strain versus Pressure (psi), at 176° C., illustrating a plot of the creep resistant material of the present invention.
Figure 8:
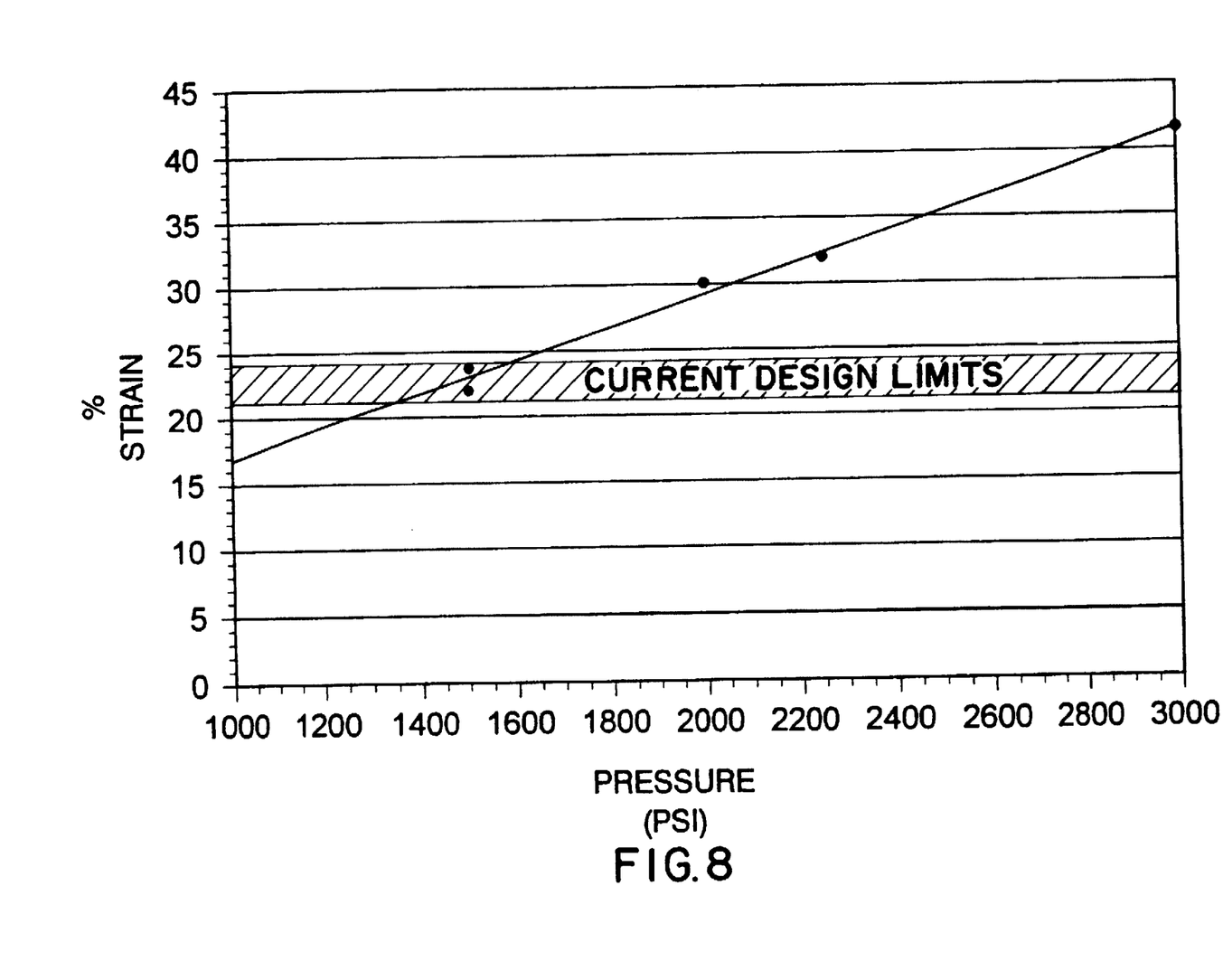
FIG. 8 is a graph of % Strain versus Pressure (psi), at 288° C., illustrating a plot of the creep resistant material of the present invention.

As evidenced by FIG. 7, the inventive creep resistant material can be used at relatively high pressures while remaining within industry acceptable creep values. For example, FIG. 7 reveals that, if the alternative tested materials described hereinabove represent an upper limit for acceptable creep behavior, the inventive creep resistant material could be employed at pressures up to 2400 psi while still exhibiting acceptable creep values. Also, and as evidenced by FIG. 8, the inventive creep resistant material could be employed at temperatures up to about 288° C., at pressures up to 1500 psi, while still exhibiting acceptable creep values.

As may be appreciated by the foregoing, one practical benefit of the lower creep nature of the inventive material is a longer useful life. If an article fails due to compressive creep after a period of time, such as a valve seat, it will have a substantially longer lifetime if made from the inventive material, as compared to an article made from the alternative tested materials. This has inherent economic value in that components would not have to be replaced or rebuilt as often.

TEST METHODS

Differential Scanning Calorimetry

Thermal analysis of a sample is determined through the use of a Differential Scanning Calorimeter. Approximately 10 mg of a sample is placed into the Differential Scanning Calorimeter and the temperature of the sample is increased from 200° C. to 400° C. at a scan rate of 10° C./min.

Density Measurement

Densities were calculated according to the Archimedean Principle whereby a density of a solid body is determined by using a liquid of known density. To this end, the article to be measured was first weighed in air and then immersed in the liquid of known density. Using these two weighings, the density of the solid body was calculated by the following equation:

$$\frac{A}{A-B} \rho_0$$

wherein, A=Weight of the solid body in air,
B=Weight of the solid body when immersed in test liquid, and
$\rho_0$=Density of the test liquid at a given temperature.

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

What is claimed is:

1. A creep resistant article dimensioned from a material consisting essentially of at least one layer of expanded polytetrafluoroethylene, exhibiting remnants of a fibril and node structure as characterized by peaks at about 327° C. and 380° C. in a thermogram of differential scanning-calorimetry in the course of a temperature rise of 10° C./min., the at least one layer of ePTFE being densified and exhibiting less than about 10% strain at 1 hour upon exposure to conditions of about 176° C. and under about 1500 psi initial stress.

2. The creep resistant article of claim 1 wherein the creep resistant article is a gasket.

3. The creep resistant article of claim 1 wherein the creep resistant article is a sealant for use in a fluid environment.

4. The creep resistant article of claim 1 wherein the creep resistant article is a valve seat.

5. The creep resistant article of claim 1 wherein the creep resistant article is a dynamic sealant for use in a fluid environment.

6. The creep resistant article of claim 1 wherein the creep resistant article is a packing for use in a fluid handling apparatus.

7. The creep resistant article of claim 1 wherein the creep resistant article is an O-ring.

8. The creep resistant article of claim 1 wherein the creep resistant article is a bearing pad.

9. The creep resistant article of claim 1 wherein the creep resistant article is a sliding pad.

10. The creep resistant article of claim 1 wherein the creep resistant article is a sliding part.

11. The creep resistant article of claim 10 wherein the sliding part is a bushing.

12. The creep resistant article of claim 10 wherein the sliding part is a bearing.

13. The creep resistant article of claim 10 wherein the sliding part is a piston ring.

14. The creep resistant article of claim 1, wherein the article exhibits less than about 25% strain when subjected to conditions of about 288° C. and under about 1500 psi pressure.

* * * * *